March 29, 1949. W. BARKER ET AL 2,465,833
UNBALANCED WEIGHT VIBRATORY SCREENING APPARATUS
Filed Oct. 29, 1946 2 Sheets-Sheet 1
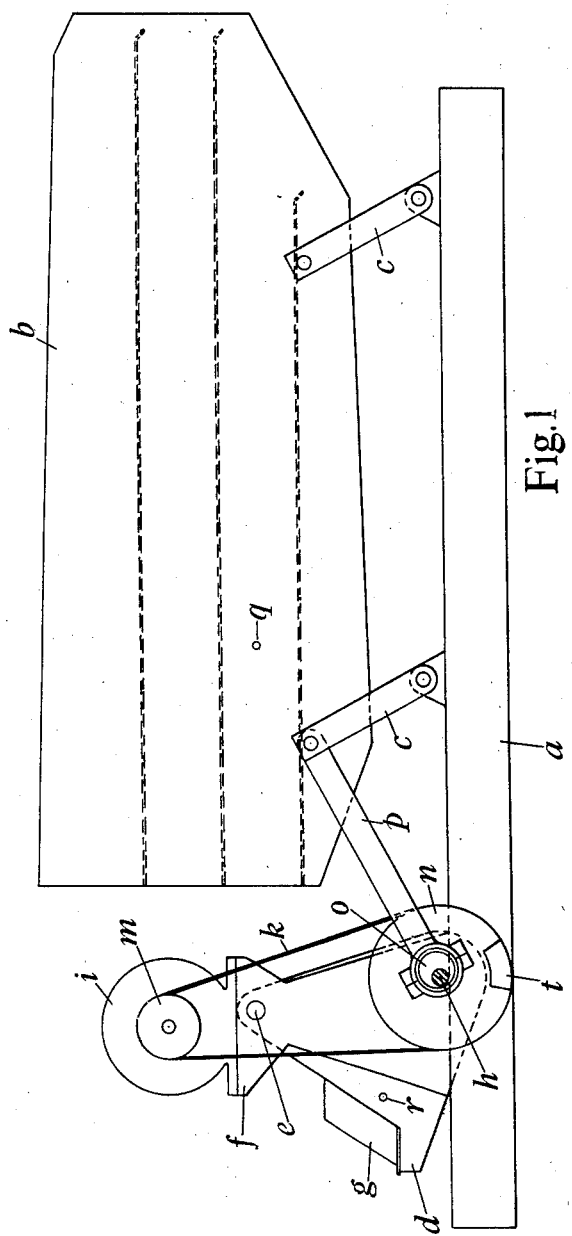

March 29, 1949. W. BARKER ET AL 2,465,833
UNBALANCED WEIGHT VIBRATORY SCREENING APPARATUS
Filed Oct. 29, 1946 2 Sheets-Sheet 2
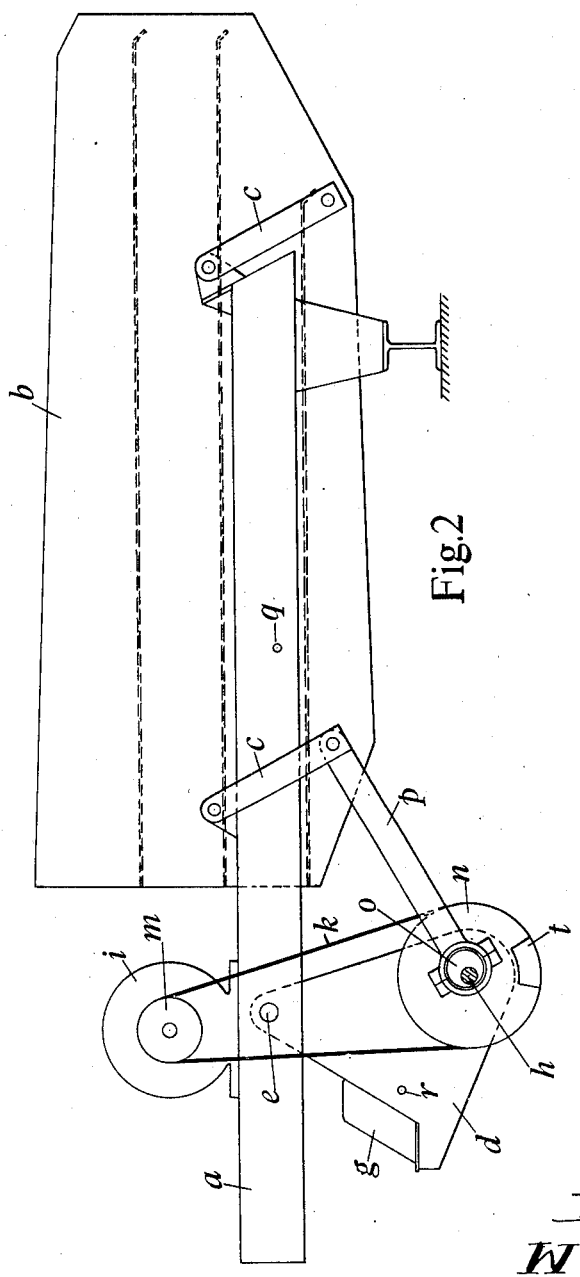
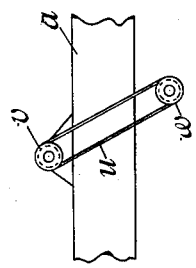
Inventors
W. Barker
W. N. Barker Patented Mar. 29, 1949

2,465,833

UNITED STATES PATENT OFFICE 2,465,833

UNBALANCED WEIGHT VIBRATORY SCREENING APPARATUS

Wilfred Barker and William Norman Barker, Stoke-on-Trent, England

Application October 29, 1946, Serial No. 706,302
In Great Britain November 13, 1945

1 Claim. (Cl. 209—329)

This invention has for its object to provide an improved vibratory screening apparatus of the kind employed in the sorting or grading of coal, or other minerals, or for other like purposes.

In the accompanying drawings, Figures 1 and 2 are respectively diagrammatic views illustrating two embodiments of the invention. Figure 3 is a diagram representing an alternative means for suspending the screen.

Referring to Figure 1, we arrange above any convenient support $a$, a screen $b$ which is arranged horizontally or with a small inclination to the horizontal. The screen is carried on the support $a$ by inclined links $c$ the lower ends of which are pivotally attached to the support and the upper ends to the screen. The links are situated adjacent to the ends of the screen and form a parallel motion system which enables the screen to be vibrated with horizontal and vertical components of motion.

Adjacent to one end of the screen is arranged a balancing member $d$. This member is of appropriate mass, and is suspended from a pivot shaft $e$ which is carried between brackets $f$ on the support $a$. The distribution of mass in the balancing member is such that its centre of gravity lies at the opposite side of the pivot shaft to the screen. The desired amount and appropriate disposition of the mass is conveniently obtained to suit a given screen by the use of a supplementary weight $g$ secured to the main part of the balancing member. On this balancing member and near its lower end is rotatably supported a driving shaft $h$, motion being imparted to the shaft from an electric motor $i$ on the brackets $f$, or other convenient means, through a belt $k$ and pulleys $m$, $n$. Also on this shaft is formed or secured an eccentric $o$ and this is connected to the screen by a connecting rod $p$. The relative dispositions of the parts are such that the connecting rod is inclined upwardly from the driving shaft $h$ to the screen, and the relative inclination of the connecting rod $p$ and the adjacent screen supporting links $c$ is approximately 90°. A continuation of the centre line of the connecting rod passes through or adjacent to the centre of gravity of the screen. In the example illustrated the centre of gravity of the screen is located at about the point $q$ and that of the balancing mass at about the point $r$. Further the arrangement of the whole assembly is such that the horizontal component of the force transmitted by the screen connecting rod $p$ to the rotating shaft $h$ is substantially counterbalanced by the horizontal component of the force between the balancing member $d$ and the shaft $h$. This leaves the vertical forces unbalanced. To balance these the pulley $n$ is in the form of a flywheel and is biassed by a mass $t$ of appropriate amount and position. When the apparatus is in action oscillatory motions are imparted to the screen and balancing member in opposite horizontal directions and when the screen and the balancing member are both moving upwards the rotating bias weight $t$ is moving downwards and vice versa. The horizontal components of the forces set up by the rotating balance weight $t$ do not disturb the horizontal balance of the apparatus. The terms "horizontal" and "vertical" are used for simplicity of explanation but it is clear that the whole apparatus could be tilted to any angle and would still be in a balanced condition.

The arrangement shown by Figure 2, is essentially similar to that shown by Figure 1, but differs in that the links $c$ are arranged so that the screen $b$ is suspended by them, the upper ends of the links being pivotally attached to the support $a$ and the lower ends being pivotally attached to the screen. Further, the balancing mass $d$ is pivotally supported by a shaft $e$ carried on the support $a$, the motor $i$ being also carried on the support. In other respects the arrangement shown by Figure 2 complies essentially with the above description of Figure 1.

By this invention we are able so to balance the forces set up when the apparatus is in action as to minimise or obviate the transmission of undesirable stresses to and the setting up of vibrations in the support which carries the apparatus.

The invention is not, however, restricted to the examples above described, as constructional or mechanical details may be varied to suit different requirements. Further instead of carrying the screen on the support by rigid links as shown in Figures 1 and 2, we may employ flexible links as exemplified by Figure 3. In this example, each link consists of an endless flexible belt, chain or the like $u$ carried by pulleys or pulley-like parts $v$, $w$, respectively mounted on the support $a$ and screen $b$. If desired each link may consist of two or more similar flexible suspensory means arranged side by side.

Alternatively any other equivalent means may be used for carrying the screen or the support, and the term linkage is used herein as including any such equivalent. Also the term eccentric as used herein is intended to include any equivalent means such as a crank or the like.

Having thus described our invention, what we claim as new and desire to secure by Letters Patent is:

A vibratory screening apparatus of the kind specified, comprising in combination a screen, a support, a parallel-motion linkage interconnecting the screen and support and consisting of links inclined to both the screen and support, an oscillatory balancing member having a fixed pivot axis and situated adjacent to one end of the screen with its centre of gravity at the opposite side of the pivot axis to the screen, a rotary shaft carried by the oscillatory balancing member, a connecting rod for imparting vibratory motion to the screen from the shaft, and a biassed fly wheel mounted on the shaft to balance force components not balanced by the oscillatory balancing member, the connecting rod being situated at an angle of approximately 90° to the links interconnecting the screen and support, and in line with the region containing the centre of gravity of the screen.

WILFRED BARKER.
WILLIAM NORMAN BARKER.

REFERENCES CITED

The following references are of record in the file of this patent:

UNITED STATES PATENTS

| Number | Name | Date |
| --- | --- | --- |
| 621,568 | Honabach | Mar. 21, 1899 |
| 787,190 | Krause | Apr. 11, 1905 |
| 874,051 | Brown | Dec. 17, 1907 |
| 2,087,092 | Lynch | July 13, 1937 |
| 2,358,876 | Overstrom | Sept. 26, 1944 |

FOREIGN PATENTS

| Number | Country | Date |
| --- | --- | --- |
| 435,854 | Great Britain | |
| (Not accepted—Public Inspection date July 2, 1934.) | | |
| 248,325 | Germany | June 20, 1912 |